United States Patent
Egner-Walter

[11] Patent Number: 5,823,065
[45] Date of Patent: Oct. 20, 1998

[54] DRIVING CRANK FOR A WINDSHIELD WIPER SYSTEM

[75] Inventor: Bruno Egner-Walter, Heilbronn, Germany

[73] Assignee: ITT Automotive Europe GmbH, Germany

[21] Appl. No.: 571,881

[22] PCT Filed: Jun. 29, 1994

[86] PCT No.: PCT/EP94/02116

§ 371 Date: Jul. 25, 1996

§ 102(e) Date: Jul. 25, 1996

[87] PCT Pub. No.: WO95/01894

PCT Pub. Date: Jan. 19, 1995

[30] Foreign Application Priority Data

Jul. 5, 1993 [DE] Germany .......................... 43 22 297.8

[51] Int. Cl.⁶ .............................. F16H 51/00; G05G 1/04
[52] U.S. Cl. .................................. 74/519; 74/545; 74/588; 15/250.3
[58] Field of Search ............................ 74/519, 545, 588; 15/250.3, 250.16, 250.351

[56] References Cited

U.S. PATENT DOCUMENTS

| | | | |
|---|---|---|---|
| 1,241,441 | 9/1917 | Pilcher | 74/519 |
| 2,938,405 | 5/1960 | West | 74/545 |
| 3,016,766 | 1/1962 | Hoyler | 74/588 X |
| 4,796,483 | 1/1989 | Patel et al. | 74/519 |

FOREIGN PATENT DOCUMENTS

| | | |
|---|---|---|
| 2356542 | 7/1977 | France . |
| 2550287 | 8/1983 | France . |
| 2406506 | 8/1975 | Germany . |
| 3428796 | 2/1985 | Germany . |
| 3443373 | 6/1985 | Germany . |
| 3643474 | 6/1988 | Germany . |
| 3643475 | 6/1988 | Germany . |
| 2088707 | 6/1982 | United Kingdom . |
| 2117630 | 10/1983 | United Kingdom . |

OTHER PUBLICATIONS

PCT Notification of Transmittal of Copies of Translation of the International Preliminary Examination Report, Dec. 18, 1995.

Search Report of the German Patent Office for Appln P4322297.8.

Primary Examiner—Allan D. Herrmann
Attorney, Agent, or Firm—Thomas N. Twomey; J. Gordon Lewis

[57] ABSTRACT

A driving crank for a windshield wiper system, wherein the crank lever is made of deep-drawn sheet metal. The crank lever has a rear part and a circumferential edge beaded towards one side of the rear part. At one end, the crank lever has an opening with an edge beaded towards the same side so as to form an inner cone. To prevent the inner cone from expanding and to reliably transmit high torques between the driving crank and the shaft to be secured in the opening, and vice-versa, the inner cone is expanded from the rear part.

7 Claims, 2 Drawing Sheets

DRIVING CRANK FOR A WINDSHIELD WIPER SYSTEM

TECHNICAL FIELD

The present invention relates to driving cranks for windshield wiper systems which can be connected to a shaft on one end, and to a wiper linkage on the other end.

BACKGROUND OF THE INVENTION

A driving crank of this type is disclosed in German Patent Application, No. 34 28 796. The driving crank is a sheet-metal part having its circumferential edges bent approximately rectangularly. The crank includes an opening having its edge beaded towards the same side as the circumferential edge so as to form an inner cone. The inner cone tapers from the back of the driving crank in the direction of the beaded edge. The inner cone serves to mount the driving crank on a shaft which has an external thread at its end and, ahead thereof, an outer cone tapering in the direction of the shaft end.

To mount the driving crank on the shaft, the inner cone of the driving crank is press-fitted to the outer cone of the shaft. The shaft end extends through the driving crank, and a nut is formed on the threaded portion which projects from the driving crank on the side of the bead. To provide a connection as reliable as possible for the transmission of forces, press-fitting the driving crank must be done by major force. However, as the material is weakest especially at that point where the highest amount of fastening force is applied, i.e., in the area of the outer edge of the inner cone in the driving crank, an additional reinforcement means is provided to prevent the wall of the inner cone from expanding. This reinforcement means preferrably includes rings of different shapes which encompass the area of the inner cone from the outside and are intended to thereby protect the beaded edge of the opening against expanding.

In spite of this additional means, which necessitates increased mounting expenditure and higher costs, a reliable torque transmission is not ensured with a driving crank of this type because it is impossible to prevent an undesirable deformation of the material of the beaded edge, which forms the inner cone, due to great restraining forces.

The fastening nut in the driving crank disclosed in German Patent Application, No. 36 43 474, has a collar which back grips a beaded edge to prevent expansion of the inner cone which is formed by the beaded edge. Although mounting is simplified because additional individual parts are omitted, as compared to the arrangement provided by German Patent Application, No. 34 28 796, the great restraining forces still deform the beaded edge of the opening. Also, uncontrollable material flow often results. This material flow permits the driving crank to loosen from the shaft and material can enter the space between the shaft and the fastening nut up to the threads. This does not ensure a reliable torque transmission, and, and if it is desired to separate the connection, such separation may be impaired or even impossible.

An object of the present invention is to provide a deep-drawn sheet-metal driving crank for a windshield wiper system permitting a connection which can be simply achieved without additional supporting means, which can reliably transmit torques as high as required and which can be dismounted in case of need without becoming damaged.

According to the present invention, this object is achieved by a driving crank having an inner cone for attaching the driving crank on the outer cone of a shaft expands from the rear part of the crank lever.

More specifically, the small cross-section of the inner cone is in the rear part of the crank lever, and the large cross-section of the inner cone is at the end of the beaded edge of this opening. In comparison with the arrangements disclosed in German Patent Applications, Nos. 34 28 796 and 36 43 474, the driving crank is mounted on a shaft turned by 180°.

When press-fitting the inner cone, the maximum force is transmitted in the narrow portion of the inner cone to the outer cone of the shaft. However, because this portion is in the range of thickness of the sheet-metal of the rear part, there is no risk that the inner cone is expanded. The material of the rear part which encompasses the narrow part of the inner cone provides a support. There is no need for additional supporting means, for example, for additional component parts or a specially shaped fastening nut, to prevent the inner cone from expanding in the area which is subjected to maximum stress. Further, because the fastening nut or a simple washer can flatly abut on the outer side of the crank lever, the contact forces are transmitted over a large surface. This distribution of force prevents the flow of material which might result in the driving crank being caulked on the shaft or the fastening nut being caulked on the thread of the shaft. Thus, if needed, the driving crank can be dismounted from the shaft without becoming damaged. Nevertheless, the restraining force in the area of the cone is sufficiently great to ensure a reliable torque transmission.

Preferably, the opening at the other end of the crank lever, in which a ball pin is attached to articulate the wiper assembly, can have a circular cross-section or a cross-section of a shape other than circular. Primarily, circular cross section is preferred because it is easier to make. However, a cross-sectional shape different from the circular shape provides a greater anti-torsion safety.

A particularly rigid connection between the crank lever and the ball pin can be provided, by deflecting or beading the edge of the opening to fasten the ball pin. In this arrangement, the ball pin can be inserted very deep into the opening, and there is a large connecting surface between the ball pin and the crank lever. The crank lever can be manufactured at low cost in only one single deep-drawing operation because the edge of the opening is beaded towards the same side as the circumferential edge and the edge of the opening for the inner cone.

On the other hand, a simple aperture in the rear part of the crank lever provides the essential benefit of a reduction in material and weight. The ball pin can be considerably shorter in this arrangement.

Further favorable reductions in weight and material can be achieved because the crank lever(corresponding to its exposure to mechanical stress)is larger in the area of the opening forming the inner cone and smaller in the area of the ball pin attachment, and tapers in the intermediate area, continuously or in steps. Of course, sharp edges are avoided.

The crank lever can have apertures or a reduced material thickness in areas without mechanical stress or subjected to only low mechanical stress to achieve a reduction in material and weight.

DETAILED DESCRIPTION OF THE PREFERRED EMBODIMENTS

Figure 1:
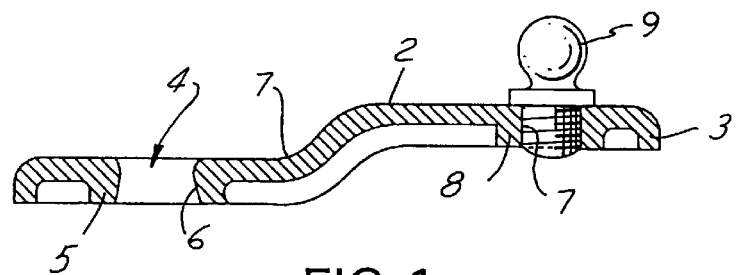
FIG. 1 is a cross-sectional view of the driving crank of the present invention.
Figure 2:
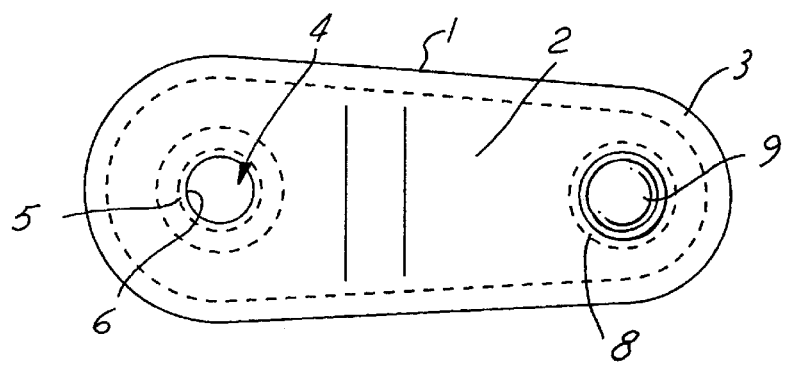
FIG. 2 is a top view of the driving crank of FIG. 1.
Figure 3:
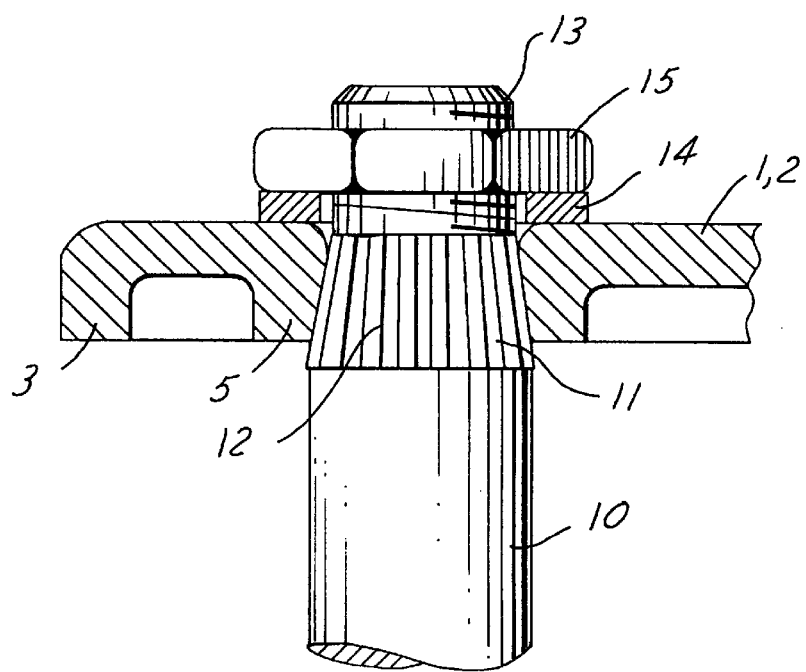
FIG. 3 is a partially cross-sectional view of the driving crank of FIG. 1 attached to a shaft.
Figure 4:
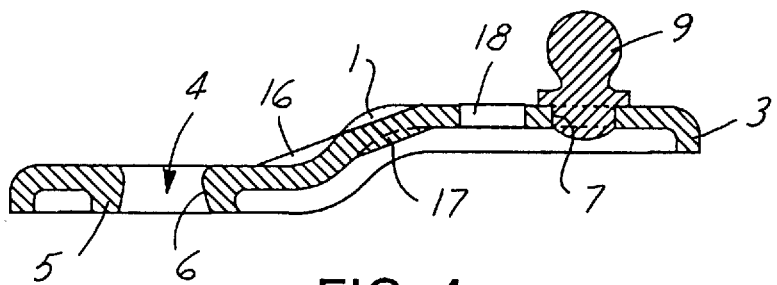
FIG. 4 is a cross-sectional view of a second embodiment of the driving crank of the present invention.

The driving crank for a windshield wiper system shown in FIGS. 1 and 2 is made of deep-drawn zinc-plated steel sheet. The use of zinc-plated steel sheet as a basic material provides the benefit that there is no need for subsequent sophisticated corrosion provisions. The driving crank includes a crank lever 1 having a rear part 2 and a circumferential edge 3 which is beaded towards one side of the crank lever 1. The crank lever has an opening 4 in its one end (which is the left end in the drawings). Edge 5 of the opening 4 is beaded on the same side of the crank lever 1 as the circumferential edge 3 so as to form an inner cone 6. The inner cone 6 expands starting from the rear part 2. In FIGS. 1, 3 and 4, the inner cone 6 expands from the top to the bottom, its smallest cross-section is in the rear part 2 and its largest cross-section is at the bottom at edge 5.

At the other end of the crank lever 1 (which is the right end in the drawings), another opening 7 can be seen having its edge 8 beaded towards the same side as edge 5 and the circumferential edge 3. A ball pin 9 is attached in the opening 7, the attachment being made by riveting or caulking. The beaded edge 8 provides a relatively long insertion length for the ball pin 9 in the opening 7, thereby requiring a very rigid and reliable connection between the ball pin 9 and the crank lever 1. Further, it can be seen in FIGS. 1 and 2 that the crank lever 1 is offset in the area between the opening 4 and the opening 7. FIG. 2 shows in addition that, for increasing the mechanical strength, the crank lever 1 is wider in the area of the opening 4 than in the area of the opening 7, and that the crank lever 1 tapers continuously between these areas.

The attachment of a driving crank on a shaft 10 is shown particularly clearly in FIG. 3. The shaft 10 has an outer cone 11 at its upper end where the driving crank extends through the opening 4. A corrugation 12 is formed in the peripheral surface of the outer cone 11 in the direction of the periphery lines. The crank lever 1 with the inner cone 6 is press-fitted to the outer cone 11 of the shaft 10. The end of the shaft 10 including the external thread 13 extends from the opening 4 and surmounts the rear part 2. After the insertion of a simple washer 14, a nut 15 is screwed onto the external thread 13 of the shaft end.

The attachment of the driving crank to a shaft 10 permits the application of great contact forces without risking an expansion of the inner cone 6 at its most dangerous point, or without risking that the crank lever 1 and/or the nut 15 are undetachably caulked on the shaft 10 due to material deformation or material flow in the area of the inner cone 6. Such a rigid press-fit connection permits a reliable transmission of high torques between the shaft 10 and the driving crank, or vice-versa.

FIG. 4 shows a second embodiment of a driving crank. In addition to the previously described features, the crank lever 1 includes, in the area of the deflection, additional depressions 16 on the top side of the rear part 2 and a depression 17 on the bottom side of the rear part 2. These means, which increase the stability, are known per se and, therefore, need not be explained in detail. Besides, an aperture 18 is provided in the rear part 2 of the crank lever 1 in a zone without mechanical stress or subjected to only low mechanical stress for achieving a further reduction in weight.

Figure 5:
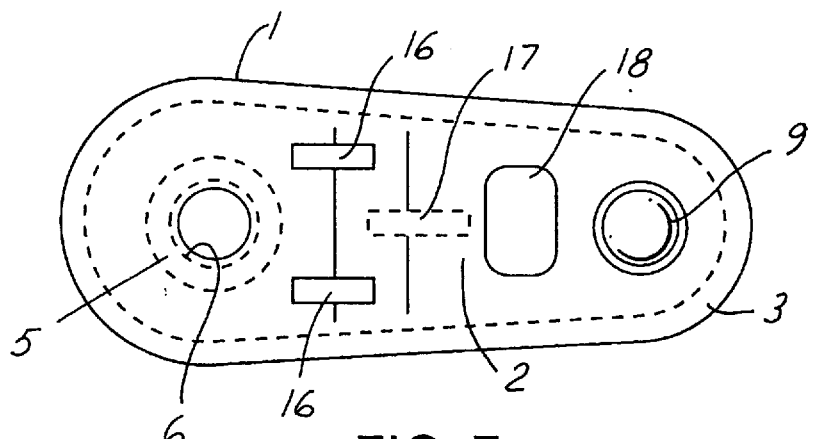
FIG. 5 is a top view of the driving crank in FIG. 4.

It can be seen in FIG. 5 that the width of the crank lever 1 is continuously reduced from the left to the right.

Figure 6:
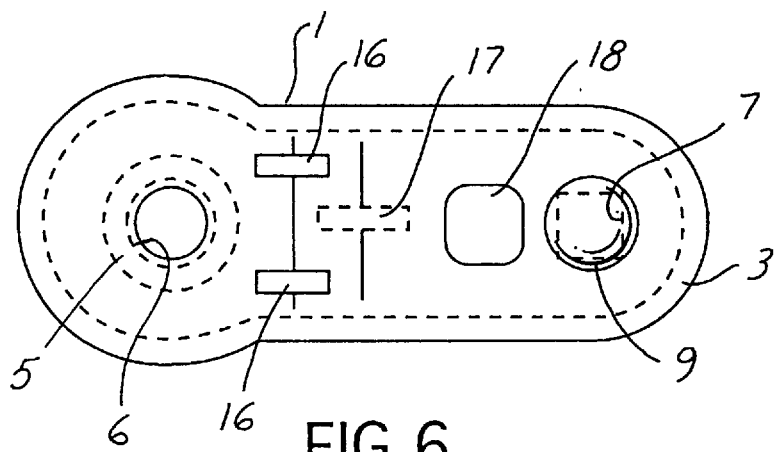
FIG. 6 is a top view of a third embodiment of the driving crank of the present invention.

However, the crank lever 1 in FIG. 6 includes a step-like reduction in the width of the crank lever 1 in the area of the opening 4. Following the reduction, the two longitudinal sides of the crank lever 1 extend at an equal distance from one another, i.e., in parallel to one another. On the right side of the aperture 18, the crank lever 1 additionally has an opening 7 with a square cross-section. Ball pin 9 with a square stud is secured in opening 7 by riveting or caulking.

A wiper linkage of a windshield wiper system can be articulated to the ball pin 9 in all the cases described hereinabove.

REFERENCE NUMERALS 1 crank lever
2 rear part
3 edge
4 opening
5 edge
6 inner cone
7 opening
8 edge
9 ball pin
10 shaft
11 outer cone
12 corrugation
13 external thread
14 washer
15 nut
16 depression
17 depression
18 aperture

I claim:

1. Driving crank for a windshield wiper system, comprising:

a crank lever made of deep-drawn sheet metal, including a rear part, a beaded circumferential edge, and a first opening at a first end of the crank lever wherein an edge of said first opening is beaded and extends away from the rear portion, wherein said beading around said first opening edge extends towards the same side as the circumferential edge so as to form an inner cone, and wherein said crank lever further includes a second opening at a second end of the crank lever wherein a ball pin is attached to said second opening, wherein the inner cone expands starting from the rear portion of the crank lever, and wherein the edge of the second opening is beaded towards the same side of the rear portion as the circumferential edge and the edge of the first opening.

2. Driving crank for a windshield wiper system as claimed in claim 1 wherein, the second opening for attaching a ball pin has a circular cross-section.

3. Driving crank for a windshield wiper system as claimed in claim 1, wherein the second opening for attaching a ball pin has a cross-section of a shape other than circular.

4. Driving crank for a windshield wiper system as claimed in claim 1, wherein the crank lever is offset in the area between the first opening and the second opening.

5. Driving crank for a windshield wiper system as claimed in claim 4, wherein the crank lever has reinforcing depressions in the area of the offset.

6. Driving crank for a windshield wiper system as claimed in claim 1, wherein the crank lever is wider in the area of the first opening than in the area of the second opening and tapers continuously or is step-like in the area there between.

7. Driving crank for a windshield wiper system as claimed in claim 1, wherein the crank lever has a reduced material thickness or apertures in those areas without mechanical stress or subjected to only low mechanical stress.

* * * * *